United States Patent
Bell et al.

(10) Patent No.: US 9,787,490 B2
(45) Date of Patent: Oct. 10, 2017

(54) METHOD OF AGGREGATING CONVENTIONAL RESOURCES UPON LOSING CONNECTIVITY TO A MASTER SYSTEM SITE

(75) Inventors: Paul G. Bell, Cary, IL (US); Jeffery T. Eschbach, Chicago, IL (US); Sonum Mathur, San Jose, CA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1839 days.

(21) Appl. No.: 12/984,298

(22) Filed: Jan. 4, 2011

(65) Prior Publication Data
US 2012/0170447 A1    Jul. 5, 2012

(51) Int. Cl.
*H04L 12/18*     (2006.01)
*H04L 29/06*     (2006.01)
*H04L 12/761*    (2013.01)

(52) U.S. Cl.
CPC ...... *H04L 12/1886* (2013.01); *H04L 65/4076* (2013.01); *H04L 45/16* (2013.01)

(58) Field of Classification Search
CPC ......... H04L 45/16; H04L 45/00; H04L 12/18; H04L 45/28; H04L 45/586; H04L 12/185; H04L 69/329; H04L 67/327; H04L 45/22; H04L 45/10; H04L 45/127; H04L 49/201; H04L 41/12; H04L 45/04; H04L 45/60; H04W 84/18
USPC ....... 370/312, 310, 338, 390, 337, 432, 222, 370/217, 221, 392, 218, 389, 352, 401, 370/216, 220, 254; 455/410, 450, 187, 455/426; 709/223, 238, 224, 236, 227
See application file for complete search history.

(56) References Cited

U.S. PATENT DOCUMENTS

| | | | |
|---|---|---|---|
| 5,387,905 A | 2/1995 | Grube et al. | |
| 5,774,786 A | 6/1998 | Wirtjes et al. | |
| 6,006,106 A * | 12/1999 | Cook et al. | 455/552.1 |
| 6,298,058 B1 | 10/2001 | Maher et al. | |
| 6,483,832 B1 * | 11/2002 | Civanlar et al. | 370/390 |
| 6,647,020 B1 | 11/2003 | Maher et al. | |
| 7,075,929 B2 * | 7/2006 | Korus et al. | 370/390 |

(Continued)

OTHER PUBLICATIONS

Cisco Systems, White Paper, "Guidlines for Enterprise IP Multicast Address Allocation", 2004.*

*Primary Examiner* — Charles C Jiang
*Assistant Examiner* — Oussama Roudani

(57) ABSTRACT

Communication systems and methods are presented for aggregating sites when connectivity to a core and zone controller therein is lost. A local controller provides multicast control to sub-sites within a locally aggregated network after detecting loss of connectivity to the core. The local controller assigns different multicast addresses than multicast addresses assigned by the zone controller. A sparse and dense mode protocol is used for multicast traffic outside and within the locally aggregated network, respectively. Conventional resources, but not trunked resources, are assigned addresses and groups. An isolated site is able to connect to the network in the event of core failure so that conventional multicast traffic traverses a direct link between each isolated site and the network, thereby extending the locally aggregated network. Multicast addresses available to be assigned by a local controller within any locally aggregated networks can be the same as those assigned by other local controllers.

9 Claims, 5 Drawing Sheets

(56) References Cited

U.S. PATENT DOCUMENTS

| | | |
|---|---|---|
| 7,633,908 B1 | 12/2009 | Kwong et al. |
| 2002/0097718 A1 | 7/2002 | Korus et al. |
| 2002/0116492 A1 | 8/2002 | Oldenborgh et al. |
| 2002/0186652 A1* | 12/2002 | Popovich ................. 370/218 |
| 2004/0190477 A1 | 9/2004 | Olson et al. |
| 2008/0031207 A1 | 2/2008 | Martinez et al. |
| 2008/0095085 A1 | 4/2008 | Goodjohn |
| 2008/0096503 A1 | 4/2008 | Economy et al. |
| 2008/0108360 A1 | 5/2008 | Baarman et al. |
| 2009/0175209 A1 | 7/2009 | Roy et al. |
| 2011/0296054 A1* | 12/2011 | Hegde et al. ............ 709/245 |

* cited by examiner

METHOD OF AGGREGATING CONVENTIONAL RESOURCES UPON LOSING CONNECTIVITY TO A MASTER SYSTEM SITE

TECHNICAL FIELD

The present disclosure relates generally to communication systems and in particular to a method of aggregating resources in a communication system after master site connectivity is lost.

BACKGROUND

Allocation and adjustment of communication resources is becoming increasingly important with the ever-escalating profusion of users and devices. In Public Safety systems, such as ASTRO systems, resource efficiency and allocation, especially during a crisis, may be of paramount importance. Many communication systems typically deploy a "star" topology, in which a master system site (also referred to as a core) connects to a number of remote system sites (RF/repeater sites, console sites, combinations thereof), and communications between the different remote system sites traverse the master system site. In such systems, a logical connection (layer-2 or layer-3 connection, such as an IP tunnel) is established between the master system site and each site, and audio traffic between sites traverses these logical connections. This star topology is especially prevalent in Public Safety or other systems with end-to-end Ethernet or IP solutions, which will only increase as customer demand for packet based services from carriers become cheaper and more ubiquitous.

Although each site has a unique logical connection to the master system site, many or all of these logical connections may traverse the same physical link. Even if the system sites themselves are geographically close or even connected physically, and even though most of the sites are likely to be geographically distant from the master system site, traffic between system sites still is routed to the master system site through the physical link. As multiple resources are sharing the link, the physical link between the sites and the master system site has much larger throughput than any site-to-site connections that may be present. The star topology also substantially limits flexibility in arranging sites in the communication system.

Each system site may have a conventional site and a trunked site for servicing calls from subscribers serviced by the site. These individual system sites are connected through a router to the master system site to enable the master system site to communicate with the individual system sites. A zone controller is typically located at the master system site and a conventional site controller and a dispatch console are typically located at one of the system sites to coordinate call resources within the communication system. When a radio keys up (requests the floor for audio transmission), the individual site servicing the radio requests resources from the zone controller. During normal multicast operation, when a conventional resource is requested on a particular channel by the radio, the zone controller grants or denies the request, assigning a multicast address when the request is granted. Similarly, when a trunked resource is requested by the radio, the zone controller grants or denies a channel from a predetermined set of channels and assigns a multicast address to that channel when the request is granted. The dispatch console (and dispatcher) coordinates activities and communication along the channels.

During normal operation (the normal system state), traffic is not routed from one system site through another to reach the master system site, as a direct path exists to the master system site. Furthermore, traffic intended to go from one system site to another traverses the master system site, going from the source system site through the master system site to the destination system site. However, the star topology is problematic in the event that the physical link to the master system site is lost or the master system site fails (failure system state). In either case, each of the logical connections traversing the link is also lost and each of the sites becomes isolated. Since access to the controller or dispatch console follows the logical connections, loss of these connections isolates sites from reaching the controller and dispatch console, resulting in subscribers at the isolated sites being unable to contact dispatchers and perhaps other subscribers. Since the long-distance physical connection may not be highly reliable, there is significant risk of isolating multiple sites due to this single failure.

Even if site-to-site connections exist, as the bandwidth between the sites may only be provisioned to support a limited amount of the overall system traffic, direct connectivity between the individual system sites may not be permitted or the amount of traffic may be severely limited. It thus would be desirable to provide a more flexible arrangement that permits at least a limited amount of multicast communication between sites when connectivity to the master system site is lost by multiple system sites.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Figure 1:
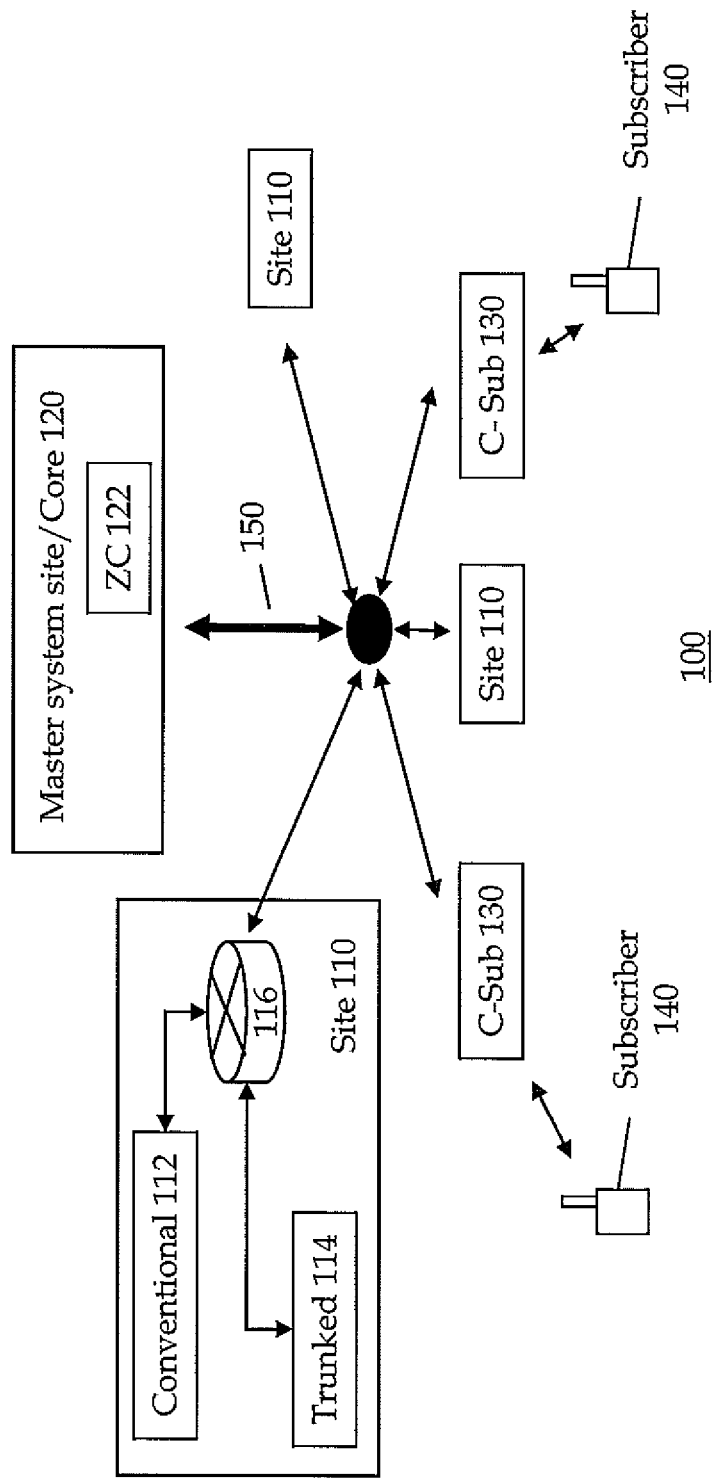
FIG. 1 illustrates one embodiment of a communication system.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Communication devices, systems, and methods are presented for aggregating sites when connectivity to a master system site and zone controller therein is lost. When master system site failure occurs (i.e., loss of connectivity to the core due to the core or links to the core going down), the system wide network, which contains the master system site, is broken up into one or more isolated locally aggregated networks (containing system sites therein) and isolated sites. A local controller in each locally aggregated network provides multicast control to sites within the locally aggregated network after loss of connectivity to the master system site is detected. The local controller assigns multicast addresses selected from a set of multicast addresses that are different than the set of multicast addresses selected and assigned by the zone controller. The set of multicast addresses from which a particular multicast address is selected depends on the scope of the multicast domain (i.e., locally aggregated network or system wide network) to whom the multicast address is assigned. Before master system site failure, different protocols are used for multicast traffic within and outside of the locally aggregated network; a sparse mode protocol is used outside the locally aggregated network while a dense mode protocol is used within the locally aggregated network. Conventional resources, but not trunked resources, are multicast assigned addresses and groups by the locally aggregated network. One isolated site is able to connect to a particular locally aggregated network in the event of master system site failure so that conventional multicast traffic is able to traverse a direct link between the isolated site and the locally aggregated network. When multiple isolated locally aggregated networks are present and able to assign multicast addresses, the multicast addresses assigned by the local controllers within the locally aggregated networks are the same as the locally aggregated networks have the same scope.

FIG. 1 depicts a communication system 100 that includes a plurality of system sites 110, conventional sub-systems 130 (C-sub), master system site 120 and subscribers 140. In IP-connected (not circuit-mode) conventional systems such as that shown in FIG. 1, the master system site 120 is geographically separated from the system sites 110 and connected through a dedicated T1 link 150. In other embodiments, a T1 topology may be used in which each system site 110 and C-sub 130 is connected to the master system site 120 through a dedicated T1 link 150.

The communication system 100 may comprise any known type of network including a wide area network (WAN), such as the Internet, the World Wide Web, a dispatch communications network, an interconnect communications network (e.g. a cellular communications network), a public switched telephone network (PSTN), a local area network (LAN), a metropolitan area network (MAN), a WiFi network, a Mesh network, a public safety network (e.g. Astro, TETRA, HPD, etc.) and/or any other network over which communication signals can be propagated. In that regard, the communication system 100 can include wired and/or wireless communication links. The communication system 100 can be configured to communicate data (e.g., audio, video, control data) via different IEEE standards such as IEEE 802 wireless communications, for example, 802.11 and 802.16 (WiMAX), 3G, 4G, EUTRAN, UMB, WPA, WPA2, GSM, TDMA, CDMA, WCDMA, OFDM, direct wireless communication, or any other communications format. Both unicast (device-to-device) and multicast (device-to-multiple devices) message may be transmitted and received in the communication system 100. The communication system 100 can be implemented in accordance with any suitable communications standards, protocols, and/or architectures, or a suitable combination of such standards, protocols, and/or architectures.

Each system site 110 may contain one or more individual sites therein that use different sources. For example, a system site 110 may contain a conventional site 112 and/or a trunked site 114, which may be connected to the master system site 120 through a router (or switch) 116. The system sites 110 and conventional sub-systems 130 (C-sub) are connected through central link 150 to the master system site 120 in a star topology, although other topologies can be used in other embodiments. The master system site 120 contains a zone controller 122, which is responsive to either trunked or conventional requests to reserve resources for a multicast session from the subscribers 140.

Each subscriber 140 can be, for instance, a mobile communication device (e.g. cellular telephone, push-to-talk radio, PDA or laptop) or any other communication device suitably configured to communicate wirelessly or through a wired connection with one or more other subscribers during a multicast session. As such, the subscriber 140 can comprise one or more processors/controllers, one or more network adapters/transceivers, and/or other suitable components.

Figure 2:
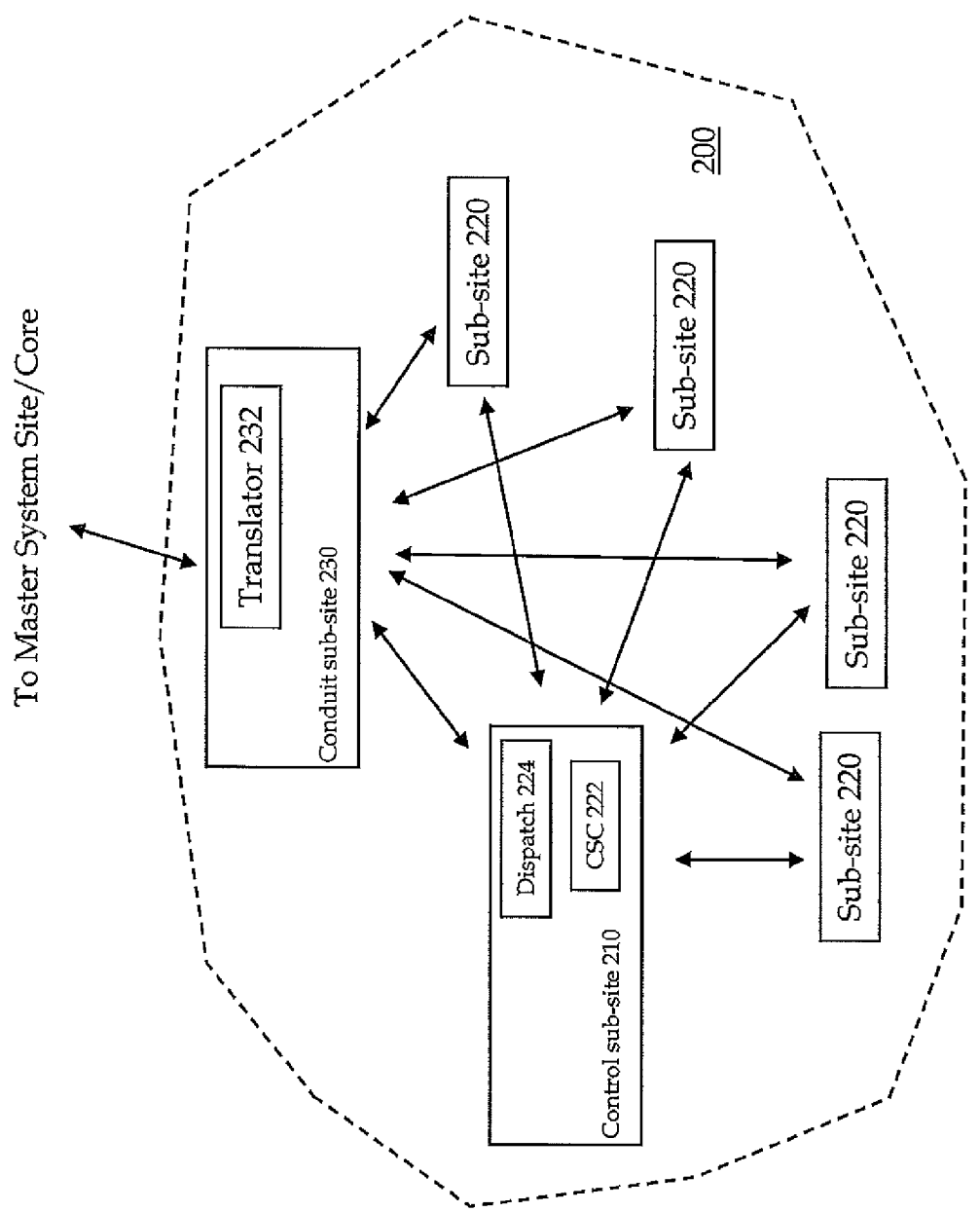
FIG. 2 illustrates one embodiment of a C-sub used in the communication system of FIG. 1.

An example of a C-sub is shown in FIG. 2. In normal operation, the C-sub 200 forms a locally aggregated network that contains multiple system sites 220, hereinafter referred to as sub-sites 220. At least one of the sub-sites is a control sub-site 210, which functions in a manner similar to one of the other sub-sites 220 and additionally contains a Conventional Site Controller 222 and dispatch console 224. In other embodiments, Conventional Site Controller and dispatch console may reside in different sub-sites, or the dispatch console may not be present in the C-sub 200. Another of the sub-sites is a conduit sub-site 230, which also functions in a manner similar to one of the other sub-sites 220. The control sub-site 210 and conduit sub-site 230 function in a manner similar to any other sub-site 220, when the C-sub 200 is connected to the master system site, save that during normal operation when the C-sub 200 is connected to the master system site all communications between the sub-sites 220 of the C-sub 200 and the master system site are routed to the master system site through the conduit sub-site 230 rather than being individually connected with the master system site. All of the sub-sites 220 in the C-sub 200 are connected with the control sub-site 210 and to the conduit sub-site 230. The conduit sub-site 230 contains a translator 232, described below. Although not shown, the sub-sites 220 may also be interconnected. The use of a C-sub 200 in the wide area network shown in FIG. 1 permits substantial flexibility in system site arrangement within the wide area network, allowing limited resource allocation to be provided to predetermined groupings of system sites in the event of master site failure as well as permitting intelligent routing decisions to be made for multicast traffic dependent on the system state, as described in more detail below.

The communication system 100 is thus formed by different network domains. These domains are defined by their span within the communication system 100. The wide-area domain covers the entire system, including the sites and the core. Multicast scoping is used to define this domain, where traffic using specific multicast addresses (those assigned by the zone controller) can traverse the entire system. The local-area domain covers only the locally aggregated network, which contains a C-Sub during normal operation and the C-Sub with any associated conventional sites (within a system site) as sub-sites therein during core failure.

Different protocols can be used for routing Internet Protocol (IP) packets to multicast groups. For example, Protocol Independent Multicast-Sparse-Mode (PIM-SM) is an effective protocol that is used in geographic areas with a high number of sites but in which only a small percentage of the subscribers are likely to subscribe to any particular multicast session. Due to the small number of subscribers, PIM-SM is able to construct a tree from each sender to the receivers in the multicast group and scales relatively well with increasing wide-area usage using a rendezvous point for one or more of the receivers. The receivers indicate to the associated rendezvous point prior to multicast messages being transmitted that they are to receive the multicast message (i.e., subscribe). As a rendezvous point generally serves many potential subscribers, the overhead associated with using a rendezvous point quickly offsets network overhead in flooding every potential subscriber with the multicast message. On the other hand, PIM Dense Mode (PIM-DM), Distance Vector Multicast Routing Protocol (DVMRP) and Multicast Open Shortest Path First (MOSPF) are effective protocols used in small geographic areas with a small number of potential subscribers. For example, PIM-DM builds shortest-path trees by flooding multicast traffic into the domain, and then pruning back branches of each tree in which subscribers are not present or do not want to receive the multicast messages. As is apparent the flooding of messages by dense mode protocols such as MOSPF, PIM-DM, and DVMRP do not scale well for limited numbers of subscribers in systems with a large number of sites, using an increasingly large amount of system resources with an increasing number of subscribers. However, it is relatively more efficient than sparse mode for small numbers of sites due to the smaller overhead.

Turning back to FIG. 1, during normal operation when the central link 150 to the master system site 120 and the master system site 120 are both operational, all traffic (data and command) flows through the master system site 120. However, the protocol used during a multicast session depends on the location of the message in the communication system 100. Specifically, traffic between the master system site 120 and a system site (whether a normal system site or a conduit sub-site of a C-Sub 130) uses a sparse mode protocol (e.g., PIM-SM) while traffic within a C-sub 130 uses a dense mode protocol (e.g., MOSPF). This permits each portion of the communication system 100 to use the most efficient protocol for that portion. The translator of the conduit sub-site of the C-sub 130 translates traffic from the master system site 120 from a sparse mode protocol message to a dense mode protocol message before forwarding the message to the sub-sites within the C-sub 130. Similarly, the translator of the conduit sub-site of the C-sub 130 translates traffic from a sub-site within the C-sub 130 from a dense mode protocol message to a sparse mode protocol message before forwarding the message to the master system site 120. During normal operation, traffic traversing the master system site 120 is provided to any system site, including back to a sub-site within a C-sub 130 from which the traffic originated.

To determine whether the communication system 100 is operating normally or whether problems with the master system site 120 exist, each system site 110 (again whether a normal system site or a conduit sub-site of a C-Sub 130) periodically communicates control information with the master system site 120. For example, the master system site 120 may periodically send control messages to the system sites 110. If a predetermined number of the periodic messages or acknowledgements from the master system site 120 are not received by the system sites 110, the system sites 110 may determine that a master system site failure has occurred. For ASTRO systems, these control messages are called Netcom control messages. When it is determined that a master system site failure has occurred (also referred to herein as failure mode), certain conventional sites are aggregated to form a shared, local network and thereby provide limited service for these conventional sites via direct inter-operation. More specifically, the communication system permits conventional resources to reach local controllers and dispatch consoles within a C-sub to form a local network that has the resources for conventional multicast operation. For ASTRO, these aggregated resources could include a conventional sub-system, conventional sites within system sites (a.k.a. "mutual aid" resources), conventional resources coupled at IP simulcast sites, or conventional-only system sites.

When a subscriber 140 keys up during a multicast session, during normal operation the zone controller 122 assigns a multicast (IP) address to the call from a limited set of IP addresses. During failure mode, since the zone controller 122 is unreachable, isolated sites are unable to communicate via multicast as multicast messages are unable to pass through the master system site 120 as well as no multicast address being assigned by the zone controller 122. On the other hand, during failure mode as one or more of the sub-sites within the C-sub 130 contains a local controller, multicast addresses are able to be assigned for a new multicast call or re-assigned for an on-going multicast call. Thus, communications are able to occur within the C-sub 130, although most (if not all) sites outside of the C-sub 130 remain isolated from the C-sub 130 as described below.

Moreover, the communication system 100 employs scoping—that is, entirely different sets of multicast addresses are assigned by the local controller within the C-sub 130 (i.e., during failure mode) than those assigned by the zone controller 122 within the master system site 120 (i.e., during normal mode), and the areas within which they operate (a.k.a. the "scope") are different. In other words, scoping pertains to the geographic range of the multicast group—the system-wide network has a different scope from the locally aggregated network formed in normal operation by the C-Sub 130 with any associated conventional sites from an isolated system site during failure. The multicast groups are mapped to different scopes and therefore assigned multicast addresses by the zone controller 122 that are different from the multicast groups spanning the locally aggregated network formed by the C-Sub 130, which are mapped to and therefore assigned multicast addresses by the local controller within the C-sub 130. This permits the conduit sub-site, for example, to make an intelligent decision as to how to route multicast traffic dependent on the address of the multicast traffic—i.e., whether multicast traffic is to be provided to the master system site 120 or is to remain inside the C-sub 130, as well as allowing discrimination of multicast calls by the router within each site in the C-sub 130 as described below.

In addition, as C-subs 130 within the communication system 100 are isolated from each other during failure mode, and therefore have the same scope, the same set of multicast addresses can be used in each of the C-subs 130. This reuse permits a relatively large number of multicast calls to occur throughout the communication system 100 within the C-subs 130 using relatively few multicast addresses during failure mode due to their isolation from each other.

In other embodiments, rather than using different multicast protocols in different segments of the network as described above, a single sparse multicast routing protocol may be used. In this case, different groups of multicast addresses are available depending on the system segment. In either embodiment, however, the multicast addresses are mapped to the different scopes associated with the multicast groups to ensure that the system, when in normal operation, can route the multicast messages anywhere in the system and the C-sub when isolated can route its assigned multicast groups without any dependency on the master system site. Scoping of multicast addresses thus occurs in either embodiment within the communication system. For PIM-SM or other sparse mode protocols, scoping uses static sets of multicast addresses rather than using the Bootstrap Router function (dynamic address allocation), which collects RP information and distributes it throughout the network. In other words, each scoped domain has a pre-defined range of multicast addresses assigned to it.

Figure 3:
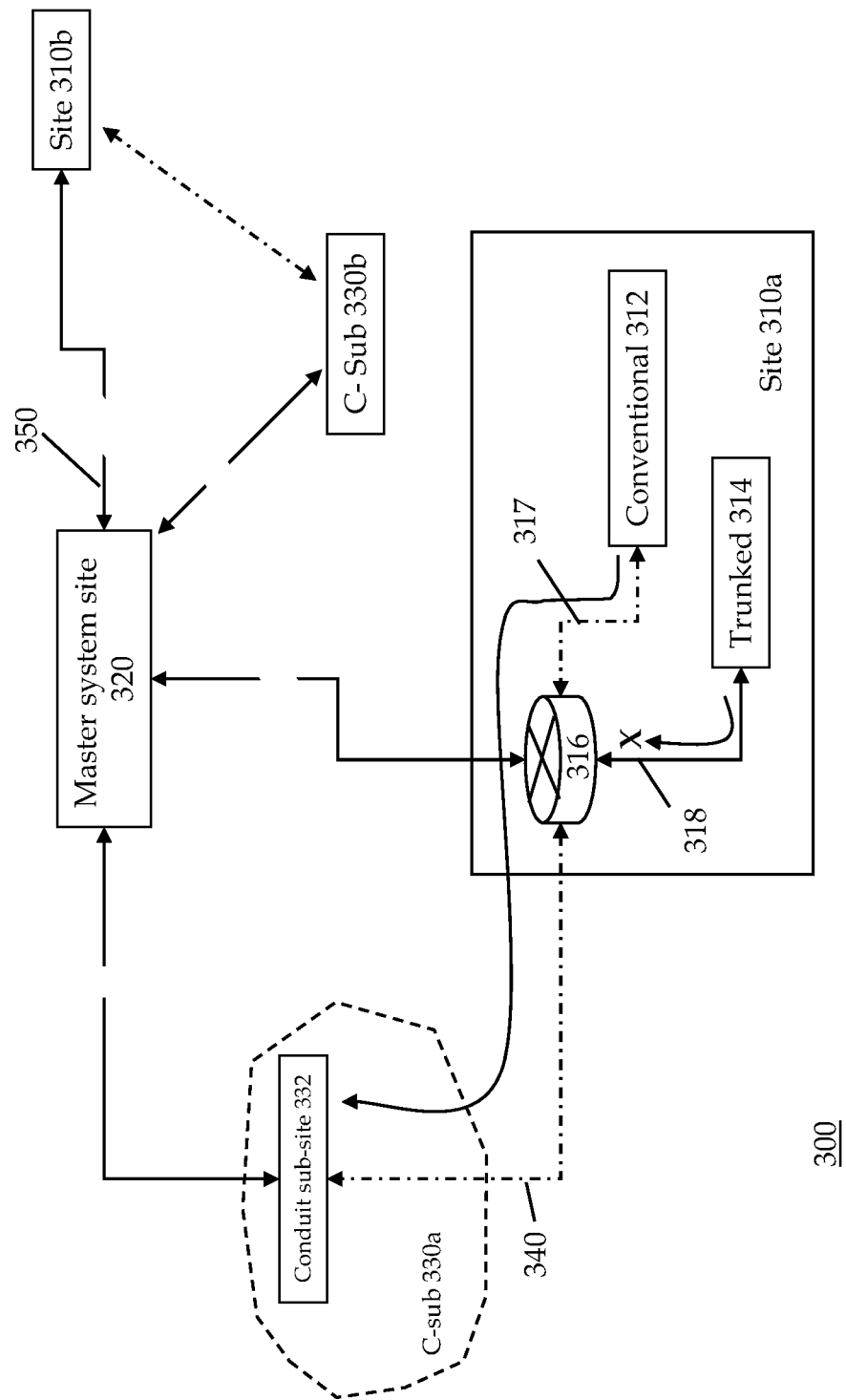
FIG. 3 illustrates one embodiment of the communication system of FIG. 1 during failure.

FIG. 3 illustrates the logical message flow within the communication system 300 when failure mode occurs. Similar to the embodiment shown in FIG. 1, the communication system 300 contains isolated system sites 310, a master system site 320 and C-subs 330. As shown in FIG. 3, the logical links 350 between the master system site 320 and the isolated system sites 310/C-subs 330 are all broken, either as a result of the master system site 320 or the physical link having failed. After this occurs, a direct link 340 between one of the isolated system sites 310a and a corresponding C-sub 330a can instead be leveraged for connectivity between the isolated system site 310a and C-sub 330a. The direct link 340 may pre-existing prior to failure or may be established upon failure. Similarly, other direct links may be leveraged between other of the isolated system sites 310b and their corresponding C-subs 330b. Some or all of the other direct links may or may not be present, although in either case, in one embodiment there is a one-to-one correspondence so that each isolated system site 310 is connected with only one of the C-subs 330, with each C-sub 330 also connected with only one of the isolated system sites 310, thereby retaining isolation between different C-subs 330 and isolated system sites 310. To discriminate between system sites served by the controller within the C-sub 330, only those sites originally within the C-sub 330 and connected to the master system site 320 through the conduit sub-site are referred to as sub-sites; i.e., even when connected through the direct link (during failure mode), the isolated system site 310 is not referred to as a sub-site.

Taking the isolated system site 310a and associated C-sub 330a for example, the direct link 340 is a logical link between the isolated system site 310a and C-sub 330a. As shown, the isolated system site 310a is connected through the direct link 340 to the conduit sub-site 332 within the associated C-sub 330a. However, in other embodiments, the isolated system site 310a may connect through the direct link 340 to one of the other sub-sites (not shown) within the associated C-sub 330a rather than the conduit sub-site 332, One or more direct links may exist and/or be active between the isolated system site 310a and C-sub 330a in various embodiments. For any direct link between an isolated system site 310a and C-sub 330a, the interface on the isolated system site 310a that faces the C-sub 330a is only scoped for the locally-aggregated network, and is not scoped for the wide-area network (more specifically, the interface on a router 316 that faces the C-sub 330a via the direct link 340 is scoped only for the locally-aggregated network). Conversely, the interface on the isolated system site 310a that faces the master system site 320 is only scoped for the wide-area network, and is not scoped for the locally-aggregated network (more specifically, the interface on the router 316 that faces the master system site 320 is only scoped for the wide-area network).

More specifically, similar to the isolated system, site 310a contains a combination of a conventional site 312 and a trunked site 314 (although in other embodiments the isolated system site 310a may also contain only a conventional site 312). This type of configuration is present, for example, in ASTRO solutions. During normal operation, communications between the conventional site 312 and trunked site 314 are provided to the router 316 within the isolated system site 310a and provided to the master system site 320 from the router 316 using a sparse mode protocol.

During failure mode, the router 316 or another element within the isolated system site 310a detects that connectivity to the master system site 320 has been lost (e.g., the link has gone down or the master system site has failed). The trunked site 314 will try to communicate to the master system site via any available path, including the path through the conduit sub-site 332. However, the direct link 340 has a limited bandwidth and thus is able to afford limited resources. If the trunked site 314 were permitted to use the direct link 340, it would overwhelm the available bandwidth of the direct link 340. As a result, the router 316 filters communications to forward multicast communications 317 from the conventional site 312 through the direct link 340 using a dense mode protocol, rather than through the logical link 350 to the master system site 320. The router 316 also filters communications 318 from the trunked site 314 so that the communications 318 from the trunked site 314 are provided to the master system site 320 through the logical link 350 but not through the direct link 340 to the C-sub 330.

The manner in which this is accomplished involves a mapping of multicast addresses to different scoped areas, where each scoped area is only valid on a given interface—depending upon the address used, it will only be forwarded to the interface that faces another node scoped for that domain. For example, in normal mode, the multicast addresses are provided by the zone controller and are mapped to the wide-area network—since the interface facing the core is scoped for this wide-area domain, but the interface facing the associated C-sub sub-site is not scoped for this traffic, then the traffic is only directed towards the core (since the interface facing the C-Sub is excluded from the wide-area scoping, traffic using addresses from the zone controller that are mapped to the wide-area domain will not traverse the logical link to the C-sub). However, in failure mode, the addresses come from the local controller and are mapped to the locally-aggregated network—since the interface facing the core is not scoped for this traffic, but the interface facing the associated C-sub sub-site is, then the traffic is directed towards the C-sub (towards the conventional controller) but is not forwarded to the core. Dynamic re-direction of IGMP messages is employed to ensure multicast join messages are forwarded only to the interface with the properly scoped domain. Multicast traffic sources from a local subscriber are also forwarded only to the interface associated with that multicast address. This ensures that multicast addresses scoped to the system level only flow to/from the master system site, and multicast addresses scoped to the local conventional site controller only flow between the aggregated conventional sites. Thus, as the multicast addresses assigned by the zone controller in the master system site 320 and by the local controller in the C-sub 330*a* are different, during failure mode the router 316 makes an intelligent decision, essentially to drop trunked communications, which have a multicast address assigned by the zone controller and transmits conventional communications, which eventually have a multicast address assigned by the local controller along the direct link 340. Based upon the multicast address used by the conventional traffic, the router knows the associated scoping and forwards the traffic on the proper interface. While in normal mode, the multicast address is scoped for the wide-area network and is forwarded to the core; while in failure mode, the multicast address is scoped for the locally aggregated network and is forwarded across the backup link towards the conventional site controller.

Figure 4:
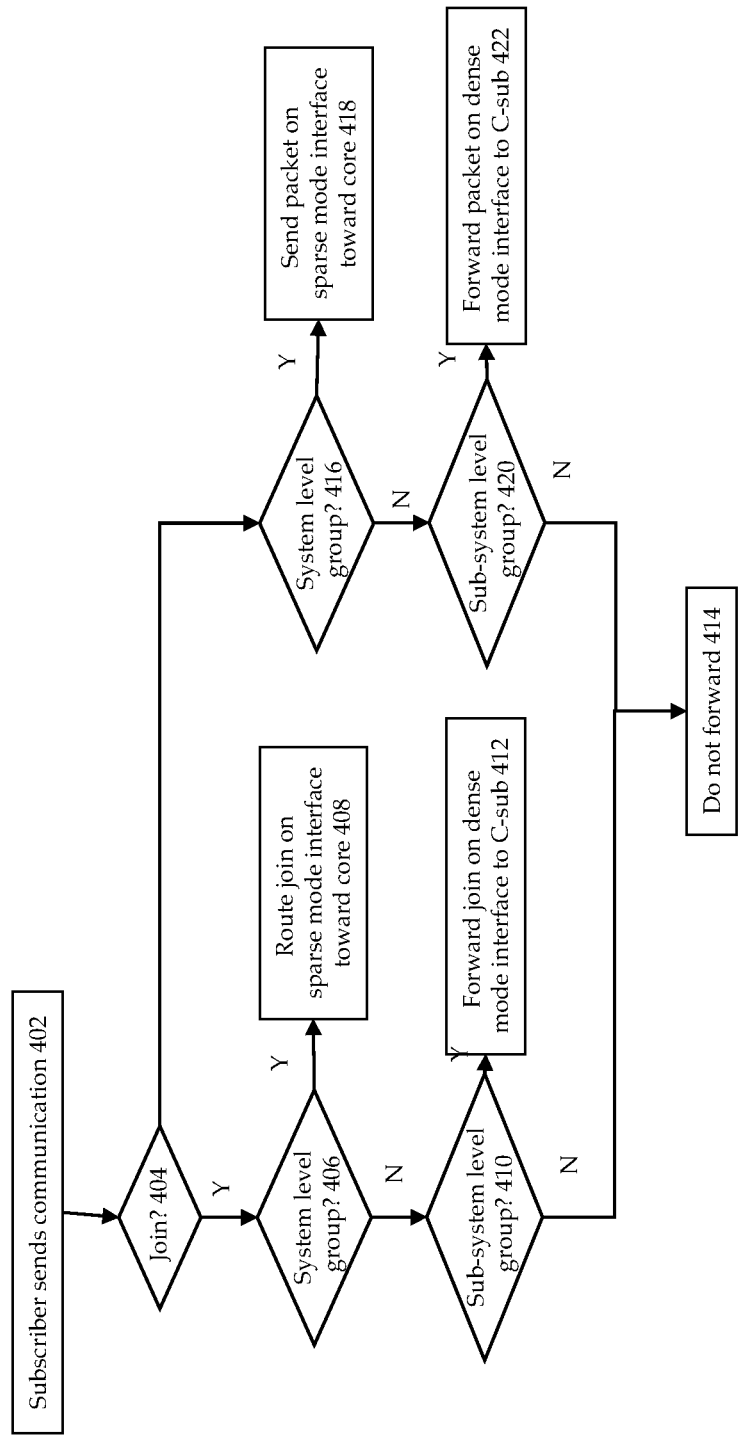
FIG. 4 illustrates a flowchart of one embodiment of a method of routing multicast communications.

FIG. 4 shows a flowchart of one embodiment of a method used by a router in a conventional site to determine where a multicast message transmitted, e.g., by a subscriber, is to be forwarded. The method may be performed at an isolated system site or at the conduit sub-site within the C-sub. At step 402, the subscriber transmits a multicast communication. Although there may be various types of communications in the communication system, for convenience the method 400 shown is limited to requests to join a multicast session and requests to transmit (e.g., a multicast audio transmission) during a multicast session. Although the various steps are similar, the method 400 separates the two types of requests at step 404. If the request is to join an ongoing or new multicast session, at step 406 the router at the site serving the subscriber determines whether a system-level group is available. In other words, it is determined at step 406 whether the system is in normal mode operation or failure mode. If it is determined at step 406 that a system-level multicast address is being used (indicating that the master system site and zone controller are available), at step 408 the join is routed on a sparse mode interface of the site toward the master system site. The sparse mode interface is an Internet Group Management Protocol (IGMP) interface enabled with PIM-SM or MOSPF.

On the other hand, if it is determined at step 406 that a system-level multicast address is not being used (indicating that a master system site failure has occurred), at step 410 the router determines whether a subsystem-level group is available (i.e., whether a local controller is available). If it is determined at step 410 that a subsystem-level group is available, at step 412 the join is forwarded on a dense mode interface of the site toward the C-sub. If it is determined at step 410 that a subsystem-level group is not available (and thus neither a system-level nor a subsystem-level group is available), at step 414 the subscriber is notified that it is unable to join any group.

If the request is to transmit a communication, at step 416 the router determines whether a system-level group is available. If it is determined at step 416 that a system-level group is available, at step 418 the packet(s) is sent on a sparse mode interface of the site toward the master system site. On the other hand, if it is determined at step 416 that a system-level group is not available, at step 420 the router determines whether a subsystem-level group is available. If it is determined at step 420 that a subsystem-level group is available, at step 422 the communication packet is forwarded on a dense mode interface of the site toward the C-sub. If it is determined at step 420 that a subsystem-level multicast address is not being used (and thus neither a system-level nor a subsystem-level group is available), at step 414 the subscriber is notified that it is unable to send the packet and should attempt transmission of the communication at a later time.

Figure 5:
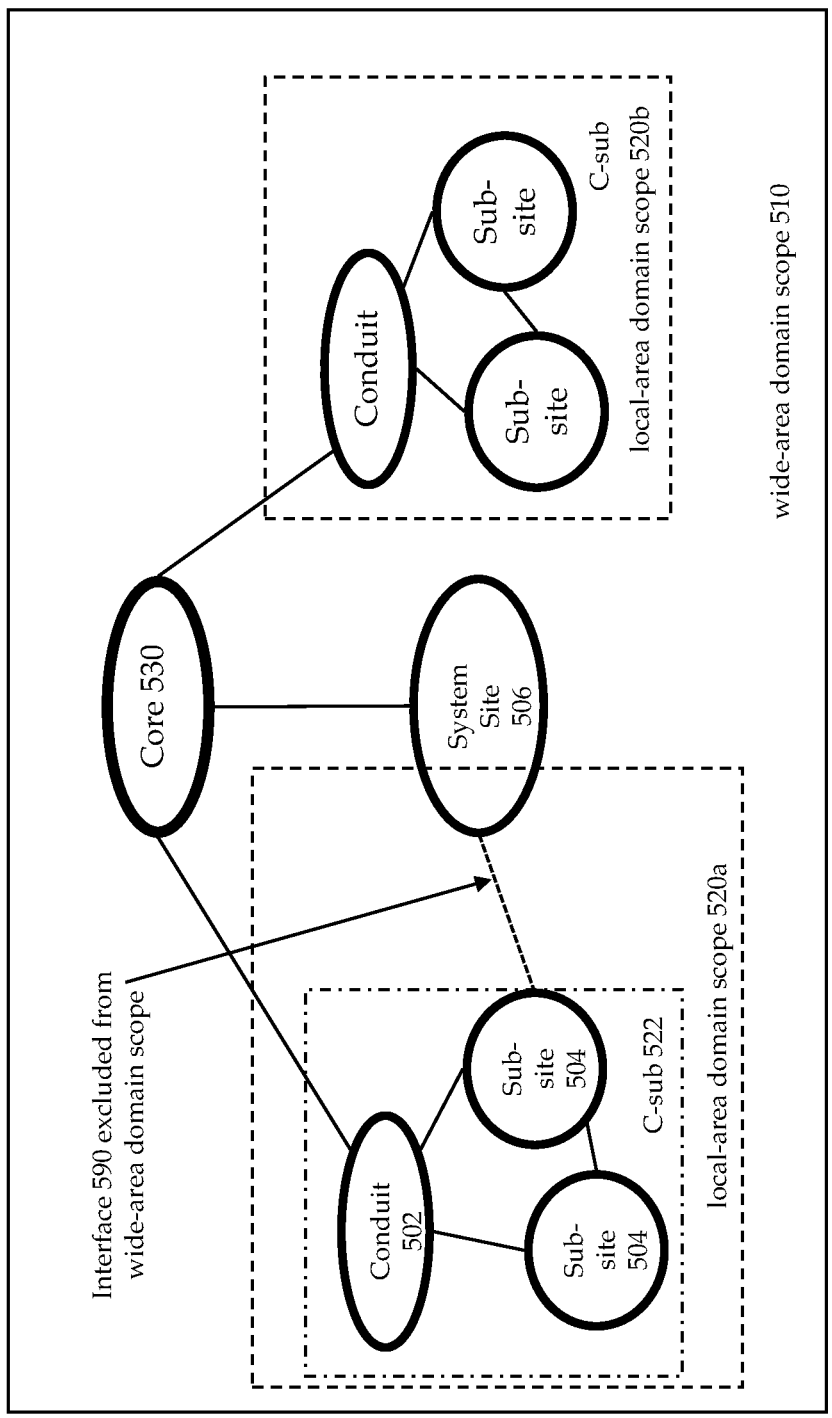
FIG. 5 illustrates one embodiment of domains within the communication system.

An example of the domains is shown in FIG. 5. As shown, the conventional portion of the communication system 500 contains a wide-area domain 510 and one or more local-area domains 520*a*, 520*b*. The wide-area domain 510 contains both local-area domains 520*a*, 520*b* as well as areas outside of the local-area domains 520*a*, 520*b*. The local-area domains 520*a*, 520*b* contain a C-sub 522 with a conduit site 502 and system sub-sites 504. During normal operation, in one embodiment each locally aggregated network contains only a C-sub 522; during failure, however, one of the local-area domains 520*a* additionally contains an isolated system site 506 while the other of the local-area domains 520*b* does not contain an isolated system site. Thus, the locally aggregated network is extended to include the isolated system site 506 during failure—whether or not it initially only contains C-sub 522 before failure. The isolated system site 506 further contains an interface 580 that faces the core 530 and an interface 590 that faces the C-sub 522, and more specifically faces the sub-site 504. The interface 580 on system site 506 that faces the core 530 is excluded from the local-area domain. The interface 590 on system site 506 that faces the C-sub 522 is excluded from the wide-area domain (the rest of the system is considered to be part of the wide-area domain). The isolated system site 506 leverages the local-area domain 520*a* only when core failure occurs (as shown by the dashed line) as it then uses multicast addresses mapped to the locally aggregated network and thereby routes multicast communications to the C-sub 522. In normal operation, the local-area domains 520*a*, 520*b* use only a dense mode protocol while the wide-area domain 510 uses both the dense mode protocol (within each C-sub 522) and a sparse mode protocol (outside each C-sub 522). In normal operation, multicast addresses from the core 530 are globally scoped and map across the wide-area domain 510 (i.e., through both local-area domains 520*a*, 520*b*), messages using both the dense and sparse mode protocol dependent on the geographical location of the message (within or outside the C-sub 520*a*, 520*b*). In failure, however, multicast addresses are locally scoped and map only uniquely through each local-area domain 520*a*, 520*b*, messages using only the dense mode protocol.

In summary, during normal operation, isolated system sites and sub-sites within local area networks use the dispatch and call control resources at a geographically remote master system site. In this normal mode, the zone controller at the master system site assigns conventional calls to system-level multicast groups so that any dispatch console in the communication system can listen in to a given conventional call and a repeater can receive audio from any dispatch console. Although direct links may be present between the system sites, when the communication system is operating in a state of normal operation, neither conventional nor trunked traffic flows directly between the system sites, even though a direct link may be present. Using the link to the master system site maintains access to all master system site functionality (e.g., data services), permits the widest application of dispatch communication (can access all sites and dispatch consoles through the master system site), and avoids overwhelming the bandwidth of the direct link between sites. The physical link between the system sites and the master system site is, however, subject to failure. In the event of a master system site failure (physical link failure or failure of the master system site), many system sites lose call control and dispatch functionality, even if there are local call control and dispatch resources that could be used. Routing to the master system site through other site links during failure is still avoided to ensure that traffic flows only where directed and guarantee that the available bandwidth of each link is not exceeded. To this end, multicast routing and groups are segmented into local (isolated to a sub-system or collection of system sites) and wide area (system-wide) domains and multicast IP address space is similarly segmented into local and wide area multicast addresses.

In particular, in normal operation, multicast traffic (calls and requests to join) is assigned to wide area domain multicast groups. When failure is detected however, the dispatch consoles and RF/repeater sites in the system search for and attempt to link up with a local conventional site controller. For example, ASTRO dispatch consoles and conventional channel gateways use Netcom to detect when communications with all zone controllers are lost. When the sub-sites in the subsystem/local area network become isolated from the master system site and begin coordinating with the local controller, the local controller assigns multicast addresses that are within the subsystem's multicast domain, which enables the network to route these messages locally without any dependence on the master system site. During failure, conventional resources are aggregated seamlessly (without manual user intervention) and with minimal failover and recovery times. Specifically, local resources provide multicast control to manage and dispatch conventional calls; on-going calls are dynamically re-assigned to local area segment multicast groups and addresses, allowing traffic to remain within properly scoped areas. Routers in these sites propagate IGMP joins only within the appropriate network segment and an intelligent decision is made about where an IGMP join is to be forwarded based on the system state (normal operation or failure). The intelligent communication (join and call) decisions are limited to conventional resources; multicast traffic destined for the wide area groups (e.g., trunked traffic) is discarded to prevent such traffic from hijacking any local bandwidth-limited connections to the master system site that may exist.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, various embodiments can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for, within a communication system in which a plurality localized sites are linked via a wide-area network and master site, compensating for loss of connectivity to the master system site, the method comprising:
   prior to loss of connectivity to the master site, assigning sparse-mode multicast addresses, by a zone controller in the master site, for multicast calls originating from subscribers in the localized sites, and routing the multicast calls, via the master site, in accordance with a sparse-mode multicast protocol; and
   responsive to a detected loss of connectivity to the master system site:
      a local controller in a first one of the plurality of localized sites taking over from the zone controller in the master site to provide multicast services to the subscribers in the first localized site; and
      assigning, by the local controller, a dense-mode multicast address for multicast calls originating from subscribers in the first localized site, and routing the multicast calls, via the first localized site, in accordance with a dense-mode multicast protocol.

2. The method of claim 1, further comprising intelligent routing of multicast traffic within the first localized site based on the multicast address assigned to the multicast traffic such that the multicast traffic within the first localized site having multicast addresses assigned by the local controller is not routed towards the master system site and the multicast traffic within the first localized site having multicast addresses assigned by the zone controller is routed towards the master system site.

3. The method of claim 1, wherein the local controller assigns multicast addresses to requests for conventional resources and denies requests for trunked resources.

4. The method of claim 1, further comprising:
   after connectivity of a second one of the plurality of localized sites to the master system site has been lost, a second local controller in the second localized site taking over from the master system site zone controller to provide multicast services to the subscribers in the second localized site; and
   assigning, by the second local controller, a dense-mode multicast address for multicast calls originating from subscribers in the second localized site, and routing the multicast calls, via the second localized site, in accordance with a dense-mode multicast protocol;
   wherein the first and second local controllers select a dense-mode multicast address to assign from a same set of preconfigured dense-mode multicast addresses.

5. A method for, within a communication system in which a plurality localized sites are linked via a wide-area network and master site, compensating for loss of connectivity to a master system site, the method comprising:
   prior to loss of connectivity to the master site, assigning sparse-mode multicast addresses, by a zone controller in the master site, for multicast calls originating from subscribers in the localized sites, and routing the multicast calls, via the master site, in accordance with a sparse-mode multicast protocol; and
   responsive to detecting a loss of connectivity to the master system site of a first one of the plurality of localized sites and of an isolated system site:
      extending the first localized site by leveraging a direct link between the first localized site and the isolated system site, separate from the link between the first localized site and the master system site, such that the isolated system site is able to communicate with a local controller in the first localized site via the direct link; and
      the local controller taking over from the zone controller to assign for requested conventional multicast traffic, but deny for requested trunked multicast traffic, a dense-mode multicast address for multicast calls originating from subscribers in the first localized site and subscribers in the isolated system site, and routing the multicast calls, via the first localized site, in accordance with a dense-mode multicast protocol.

6. The method of claim 5, wherein the direct link is used only when connectivity is lost between the isolated system site and the master system site.

7. The method of claim 5, wherein dense-mode multicast addresses able to be assigned by the local controller are selected from a different range of addresses than sparse-mode multicast addresses able to be assigned by the zone controller.

8. The method of claim 7, further comprising, after connectivity of a second one of the plurality of localized sites to the master system site has been lost:
   a second local controller in the second localized site taking over from the master system site zone controller to provide multicast services to the subscribers in the second localized site; and
   assigning, by the second local controller, a dense-mode multicast address for multicast calls originating from subscribers in the second localized site, and routing the multicast calls, via the second localized site, in accordance with a dense-mode multicast protocol;
   wherein the first and second local controllers select a dense-mode multicast address to assign from a same set of preconfigured dense-mode multicast addresses.

9. The method of claim 5, wherein multicast traffic is re-directed at the isolated system site based on scoped interfaces of the isolated system site in which an interface facing the localized site is only scoped for dense-mode multicast calls and an interface facing the master system site is only scoped for sparse-mode multicast calls.

* * * * *